July 4, 1961

W. W. B. SCHUMACHER 2,991,362

MEANS AND METHOD FOR X-RAY SPECTROMETRY

Filed March 27, 1959

Wilhelm W. B. Schumacher
Inventor by:

July 4, 1961  W. W. B. SCHUMACHER  2,991,362
MEANS AND METHOD FOR X-RAY SPECTROMETRY
Filed March 27, 1959  3 Sheets-Sheet 2

Wilhelm W. B. Schumacher
Inventor

United States Patent Office

2,991,362
Patented July 4, 1961

2,991,362
MEANS AND METHOD FOR X-RAY SPECTROMETRY
Wilhelm W. B. Schumacher, Scarborough, Ontario, Canada, assignor to Ontario Research Foundation, Toronto, Ontario, Canada
Filed Mar. 27, 1959, Ser. No. 802,543
12 Claims. (Cl. 250—51.5)

This invention relates to a method and apparatus for spectrochemical analysis by means of X-rays.

In my co-pending application Serial No. 506,585, now U.S. Patent No. 2,908,821. I have described and claimed a method and apparatus for spectrochemical analysis of solids, liquids and gases which makes use of so called pressure stage stretches which permit the elimination of a foil window. The construction and apparatus of pressure stage stretches in themselves is shown in co-pending United States application Serial No. 386,085, now abandoned, which is based on German Patent No. 971,610 of which I am a co-inventor. A pressure stage stretch consists essentially of a plurality of apertures aligned about an axis the spaces between adjacent apertures being connected to vacuum pumps which continuously withdraw the air admitted to the space as described in the aforesaid co-pending application No. 386,085. If the pumps provide a vacuum increasing from the outside stage to the inside, it is possible to provide a clear passage from a very high vacuum in the interior of the stages to atmosphere or greater pressure at the outside.

The co-pending application Serial No. 506,585 described and claimed an apparatus for spectrochemical analysis using a pressure stage stretch, the feature of the invention being that a stream of exciting electrons was produced and focused within a vacuum, passed through a pressure stage stretch to excite a sample maintained at substantially atmospheric pressure and the X-rays thus excited by the sample were repassed through the same pressure stage stretch but in the direction opposite to the direction of the electrons to a spectrometer or to a diffraction element located within the same vacuum in which the electrons were produced.

The advantages of locating the sample to be examined in atmosphere rather than a vacuum as has heretofore been the case have been pointed out at length in my co-pending application No. 506,585. The principal advantage resides in the fact that it is impossible to introduce certain volatile liquids and even some solids into the vacuum and it is certainly impossible to introduce gases, thereinto without changing their physical character and preventing proper spectrographic analysis. The maintenance of the sample in the atmosphere overcomes these disadvantages. Some prior methods of which I am aware pass the electrons or the X-rays excited through a foil window. The disadvantages of the foil window are also pointed out in my co-pending application Serial No. 506,585. They reside principally in the fact that foil windows reduce the intensity of the beam and thus the sensitivity of the examination.

I have now discovered that the method and apparatus of my co-pending application Serial No. 506,585 while it possesses the above noted advantages over the prior art, nevertheless requires a great deal of precision in the focusing of the electron beam to ensure that the electron beam passes through the apertures in the pressure stage stretch without touching the edges of those apertures. The apertures in the pressure stages may be from 0.1 to 1.0 mm. in diameter. Although it is possible to focus an electron beam by means of electron optical means to pass through apertures of this order without touching the edges, such electron optical means are expensive. It will be appreciated that if the electron beam touches the wall or the edge of one of the apertures it will excite X-rays characteristic of the material of the wall which, in the practice of the method of my co-pending application Serial No. 506,585 could well enter the spectrometer and provide a disturbing effect.

It is the principal object of this invention to provide a method and apparatus for X-ray spectrometry which will permit the analysis of solids, liquids and gases maintained at or substantially at atmospheric pressure and which will obviate the disturbing effect caused by the electron beam touching the edge of one of the apertures of the pressure stage stretch, without the necessity of expensive optical electron focusing means.

It is a further object of this invention to provide such a method and apparatus which retains all of the advantages of the method and apparatus of my co-pending application Serial No. 506,585.

It is another important object of this invention to provide such a method and apparatus as will permit the visual microscopic observation of the particular area under analysis during analysis.

My invention consists broadly in an apparatus for spectrochemical analysis including means for providing and focusing a stream of electrons in a vacuum, a first pressure stage stretch providing a passage for said stream of electrons from said vacuum to the observation space to excite X-rays of a sample located therein, an X-ray spectrometer located in a vacuum a second pressure stage stretch providing a passage for the X-rays from the sample to the X-ray spectrometer, the axes of the electron beam and the axis of observation of the spectrometer being so inclined to each other as to intersect outside the vacuum on the target; together with certain means for aligning the electron beam axis and the axis of the observation of the spectrometer and means for determining the point of intersection thereof.

The invention may be better understood by a consideration of the following detailed description taken in conjunction with the attached drawings in which.

Figure 1:
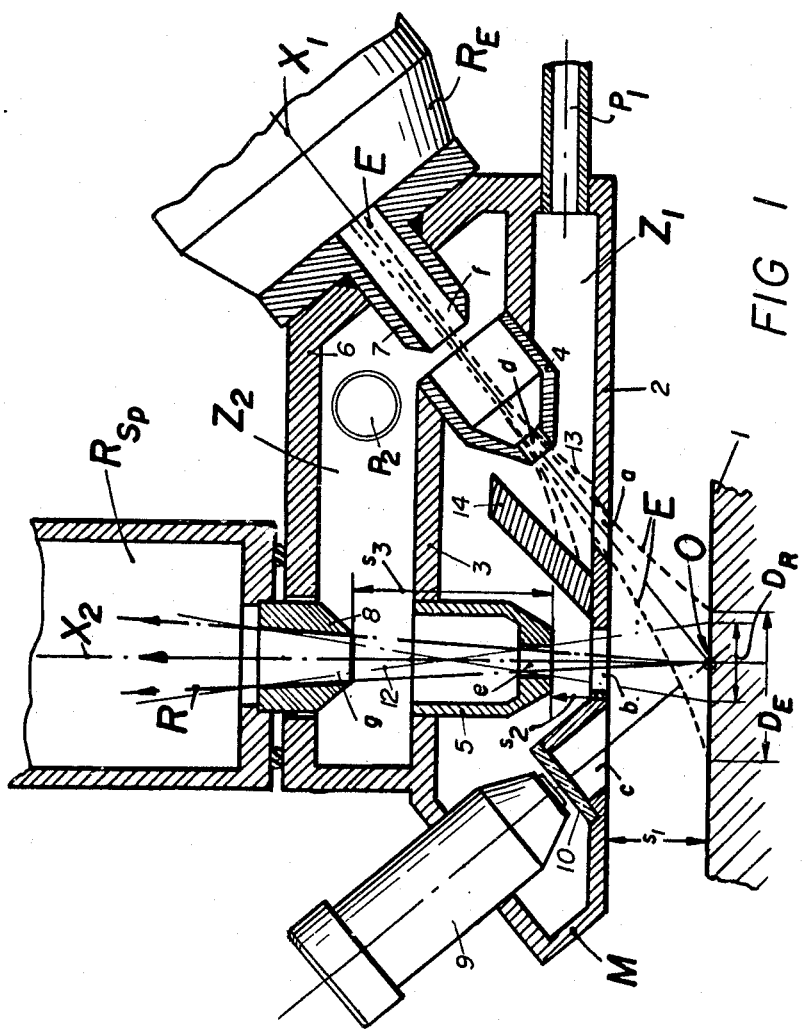
FIGURE 1 is a vertical cross section, partly schematic, of a spectrometer constructed so as to embody features of this invention.
Figure 2:
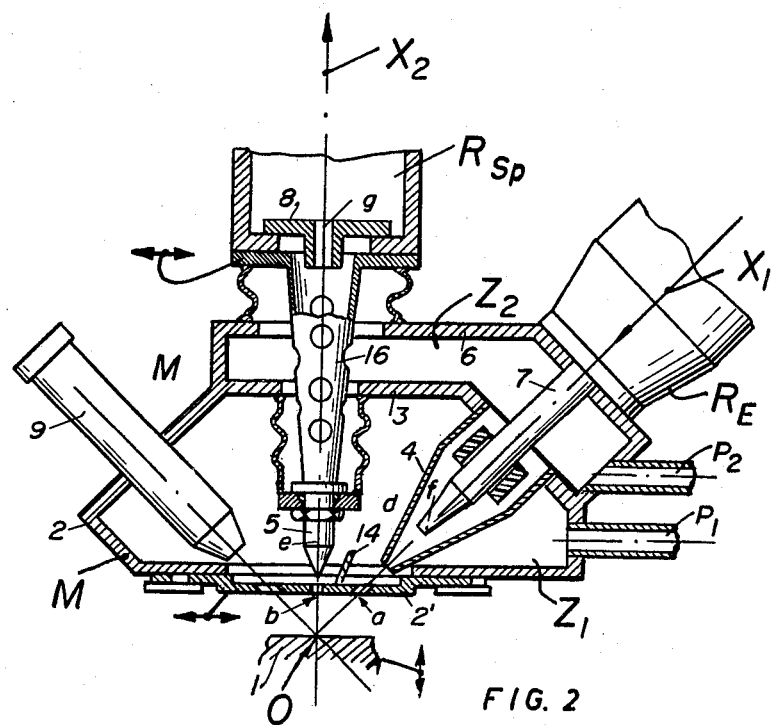
FIGURE 2 is a view similar to FIGURE 1 showing an alternative embodiment of the invention.

In greater detail and referring now to the drawings, which are not to scale but show the principle of the inventive design schematically, 1 in both FIGURES 1 and 2 represents the target substance to be analysed which is retained in a frame permitting a three-dimensional orientation of the target. In the embodiment shown in FIGURES 1 and 2, the target 1, is surrounded by atmospheric air and thus may be a solid or a liquid.

In the embodiment shown in FIGURES 1 and 2 a unitary structure provides both the first and second pressure stage stretches hereinafter referred to in detail, this unitary structure being referred to generally as M and containing vacuum chambers $Z_1$ and $Z_2$ connected respectively to vacuum pumps $P_1$ and $P_2$. The wall 2, of structure M, contains apertures $a$ and $b$, defining the exit apertures of the first and second pressure stage stretch respectively. The next interior aperture of the first pressure stage stretch is the aperture $d$, formed in insert 4, the vacuum chamber $Z_1$ being defined by the space between apertures $a$ and $d$. In the embodiment shown there are two pressure stages $Z_1$ and $Z_2$ for the first pressure stage stretch, the chamber $Z_2$ being defined between aperture $d$, and aperture $f$, located in insert 7.

The second pressure stage stretch is similarly defined by the exit aperture $b$, aperture $e$ in insert 5 and aperture $g$ in insert 8, the vacuum chamber a first stage $Z_1$ being defined by the space between the apertures $b$ and $e$ and the vacuum chamber a second stage $Z_2$ being defined by the space between apertures $e$ and $g$. Atmospheric air entering the apertures at $a$ and $b$ is continuously pumped off by the vacuum pumps keeping the gas pressure in $Z_1$ and $Z_2$ in a state of equilibrium all as described in the co-pending application Serial No. 386,085.

An electron gun $R_E$ is provided with its own associated high vacuum pump. In the embodiment shown the electron gun provides and focuses a beam of electrons E in a high vacuum the axis of the beam $X_1$ being determined by the alignment of the apertures $a$, $d$ and $f$.

An X-ray spectrometer $R_{Sp}$ is provided in its own high vacuum the axis of observation of this spectrometer $X_2$ being determined by the alignment of apertures $g$, $e$ and $b$ of the second pressure stage stretch. The axis of the electron beam $X_1$ and the axis of observation of the spectrometer $X_2$ are inclined to each other so that they intersect outside the vacuum at the point O at which the target is maintained.

In the embodiment shown in FIGURE 2 a slidable plate 2' is provided having holes therein defining apertures $a$ and $b$. The axis $X_1$ and the axis $X_2$ may in this embodiment be aligned by sliding the plate 2' to one side or the other. Also in the embodiment shown in FIGURE 2 alignment of the axis of observation of the spectrometer $X_2$ may also be effected through the adjustable bellows means shown in the drawings. It will be appreciated that the target being adjustable three-dimensionally will be oriented so that it coincides at the point of intersection of the axes $X_1$ and $X_2$.

The electron beam E produced in the electron gun $R_E$ is directed through the apertures $f$, $d$ and $a$ and on to the target 1, at O. Due to the inevitable scattering the electron beam E will increase in cross section and the area of the target 1, which is bombarded by the electrons is shown in the drawings as dimension $D_E$. $D_E$ may vary in practice from 0.5 mm. to 3 mm. although the diameter of $a$, is only 0.2 mm.

According to an important feature of this invention the diameter of the apertures $b$, $e$ and $g$ and their distances apart $s_2$ and $s_3$ as well as the distances of the exit aperture $b$, to the target 1 ($s_1$), are chosen in such a manner that the cone of observable radiation R at the spectrometer $R_{Sp}$ is produced from an observation area $D_R$ on the target which is substantially smaller than $D_E$. In other words the observation path is so chosen that an area, at the target, smaller than the area bombarded is observed by the spectrometer. At the same time aperture $b$ is kept so large that its edge, likely to be hit by scattered electrons, lies outside the cone of radiation R thus preventing spurious radiation from the edge from entering the spectrometer. The selection of the diameters of the apertures $b$, $e$ and $g$ for any given or desired values of $s_1$, $s_2$ and $s_3$ may readily be determined for any particular purpose.

In the embodiment shown in FIGURE 2, part 5 contains aperture $e$ and part 8 contains aperture $g$. These parts being rigidly connected to the spectrometer $R_{Sp}$ by means of a perforated tube 16, a flexible but vacuum type connection between 5 and 3 and 8 and 6 being provided to permit shifting and tilting of the spectrometer $R_{Sp}$ relative to the spectrometer M so that 5 and 8 or $e$ and $g$ respectively can be made to coincide with the axis $X_2$.

According to another important feature of this invention the area of the target under bombardment and observation by the spectrometer can be maintained under continuous microscopic examination by providing a microscope 9 having its axis of observation inclined to the spectrometer observation axis $X_2$. In the embodiment shown the microscope pierces the vacuum chamber $Z_1$ although it will be appreciated that this has been done for space consideration and is not essential to or a part of this invention. The microscope is preferably focused in such a manner that its point of focus occurs at the point of intersection of axes $X_2$ and $X_1$. The range $D_R$ observable by the spectrometer can then be marked on the field view of the microscope so that the area under X-ray examination $D_R$ may be maintained in focus and under direct simultaneous microscopic examination.

Figure 4:
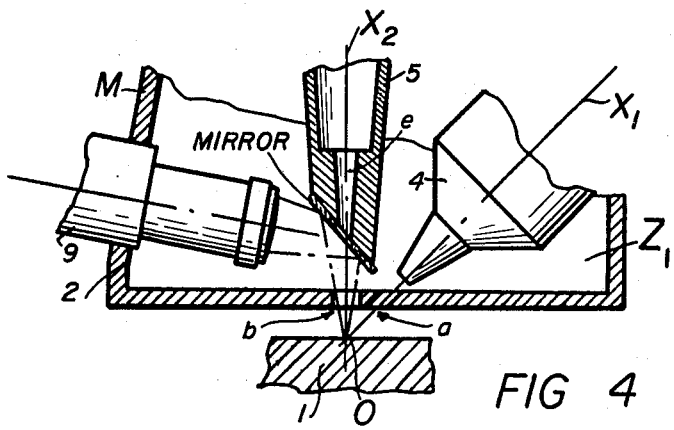
FIGURE 4 is a view similar to FIGURE 3 showing a further alternative embodiment of the invention.

A further alternative arrangement of the microscope is shown in FIGURE 4. In this case the exit aperture $e$ of the insert 5 is provided with an inclined mirror, the aperture $e$, being situate in the middle of the mirror face. The microscope 9 in this embodiment is directed at such an angle to the inclined mirror that the microscope is by reflection sighted along the axis $X_2$ to focus at point O at the intersection of $X_2$ and $X_1$. The advantage of this arrangement compared with that of FIGURE 2 is that the range $D_E$ of the sample 1 is observed perpendicularly to the surface instead of at an angle thereto permitting the use of higher magnifications of the microscope.

In both the embodiments of FIGURES 1 and 2 and of FIGURE 4, if the focus of the microscope 9 is such to coincide with the point of intersection of the axes $X_1$ and $X_2$, the proper position for the target 1 may be determined by shifting 1 until its surface is in focus as observed by the microscope 9.

In the embodiments shown in FIGURES 1 and 2 a shield 14, prevents electrons which are scattered in the vacuum chamber $Z_1$ and which follow the path shown as 13 to enter the aperture $e$. The shield 14 also guards against X-rays emitted from the edge of $a$ and which might otherwise produce secondary X-rays at $e$.

It will be appreciated that according to the manner of this invention a very fine or precisely focused electron beam is not strictly required. It is important in the practice of the invention that the exit aperture $b$ of the second pressure stage stretch be sufficiently larger than the next interiorly adjacent aperture $e$, so that the passage of the observable X-rays from the area $D_R$ to the spectrometer $R_{Sp}$ will not touch the side walls of $b$.

Figure 3:
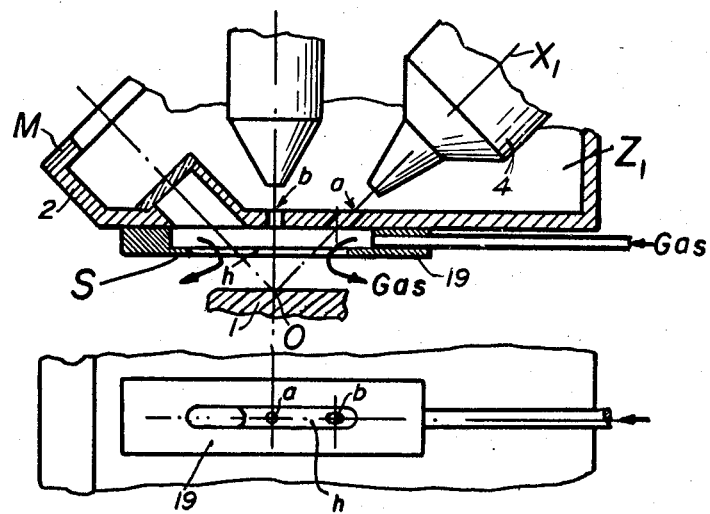
FIGURE 3 is a view of a portion of FIGURE 2 showing a further embodiment of the invention.

A further embodiment of the invention is illustrated in FIGURE 3. In this case a flat chamber S is provided exteriorly adacent to the exit apertures $a$ and $b$ of the pressure stage stretch. This chamber is provided with exterior apertures permitting the passage of the electrons and X-rays as well as an observation sight from the microscope. Gas may be provided to this chamber S which will flood the space between the sample and the apertures $a$ and $b$. This embodiment is important where the presence of air would interfere with a precise analysis of the sample, and will permit the sample to be surrounded with an inert gas such as argon or helium or any other desirable gas.

The invention has been described with references to preferred embodiments and certain constructional details. It is to be understood that the invention is not to be considered as limited to the precise embodiments or constructional details shown and such embodiments of the invention as come within the scope and purview of the appended claims are to be considered as part of this invention.

What I claim as my invention is:

1. Apparatus for spectrochemical analysis by means of X-rays which comprises in combination, a vacuum chamber, means for providing and focusing a stream of electrons in said vacuum chamber, a first pressure stage stretch providing a passage for said stream of electrons from said vacuum to a space having a gas pressure substantially atmospheric to excite X-rays of a sample maintained in said space, an X-ray spectrometer located in a vacuum, a second pressure stage stretch providing a passage for said X-rays from said sample to said X-ray spectrometer, the axis of the electron beam and the axis of observation of the spectrometer being inclined to each other, and means for aligning the electron beam axis and the axis of observation of the spectrometer axis to intersect outside the vacuum on the target.

2. Apparatus as claimed in claim 1 wherein the area of the sample bombarded by the electrons is substantially larger than the area observable by the X-ray spectrometer.

3. Apparatus as claimed in claim 2 wherein the exit aperture of the second pressure stage stretch is sufficiently larger than at least the next interior aperture thereof, so that the side walls of said exit pressure stage stretch are not observable by the X-ray spectrometer.

4. Apparatus as claimed in claim 3 together with means for adjusting the target relative to the said first and second pressure stage stretches.

5. Apparatus as claimed in claim 3 together with means for detecting and determining the point of intersection of the electron beam axis and the axis of observation of the spectrometer.

6. Apparatus as claimed in claim 3 wherein said means for aligning the electron beam axis and the axis of observation of the spectrometer comprises a slidable plate having apertures therein at fixed and predetermined distances from each other, each of said apertures defining the exit aperture of one of the pressure stage stretches.

7. Apparatus as claimed in claim 5 wherein said means for detecting the point of intersection of the electron beam axis and the axis of observation of the spectrometer comprises a microscope inclined to the axis of observation of the spectrometer and having its focus at the point of intersection of the spectrometer axis of observation and the axis of the electron beam.

8. Apparatus as claimed in claim 5 wherein said means for detecting the part of intersection of the electron beam axis and the axis of observation of the spectrometer comprises a microscope inclined to the axis of observation of the spectrometer and reflecting means adapted to permit said microscope to sight along the axis of observation of the spectrometer, said microscope having its focus at the point of intersection of the axis of observation of the spectrometer and the axis of the electron beam.

9. Apparatus as claimed in claim 3 together with an additional chamber immediately adjacent to the exit apertures of the first and second pressure stage stretches having exit passages therein permitting passage of the electrons and X-rays therethrough, said passage being supplied with gas under pressure greater than atmosphere.

10. Apparatus as claimed in claim 3 wherein the vacuum for corresponding stages in said first and second pressure stage stretches is provided by a single pump.

11. Apparatus as claimed in claim 3 wherein the first and second pressure stage stretches are embodied in a unitary structure having vacuum chambers common to corresponding stages in said first and second pressure stage stretches.

12. Apparatus for spectrochemical analysis by means of X-rays which comprises in combination, a first vacuum chamber, means for providing and focusing a stream of electrons in said vacuum chamber, a first pressure stage stretch providing a passage for said stream of electrons from said first vacuum to a space having a gas pressure substantially atmospheric to excite X-rays of a sample maintained in said space, an X-ray spectrometer located in a second vacuum, a second pressure stage stretch providing a passage for said X-rays from said sample to said X-ray spectrometer, the axis of the electron beam and the axis of observation of the spectrometer being inclined to each other, and means for aligning the electron beam axis and the axis of observation of the spectrometer axis to intersect outside the vacuum on the target.

References Cited in the file of this patent

UNITED STATES PATENTS

| | | |
|---|---|---|
| 2,273,235 | Ardenne | Feb. 17, 1942 |
| 2,640,948 | Burrill | June 2, 1953 |
| 2,824,232 | Steigerwald | Feb. 18, 1958 |
| 2,837,656 | Hendee et al. | June 3, 1958 |
| 2,847,579 | Allen et al. | Aug. 12, 1958 |

FOREIGN PATENTS

| | | |
|---|---|---|
| 785,845 | Great Britain | Nov. 6, 1957 |